(12) United States Patent
Favors et al.

(10) Patent No.: US 8,785,593 B2
(45) Date of Patent: Jul. 22, 2014

(54) POLYAMIDOAMINE-EPIHALOHYDRIN RESINS, METHOD OF MANUFACTURE, AND USES THEREOF

(75) Inventors: Karla D. Favors, Atlanta, GA (US);
Clay E. Ringold, Decatur, GA (US);
Yuping Luo, Duluth, GA (US); Cornel Hagiopol, Lilburn, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 175 days.

(21) Appl. No.: 13/448,982

(22) Filed: Apr. 17, 2012

(65) Prior Publication Data

US 2012/0271008 A1  Oct. 25, 2012

Related U.S. Application Data

(60) Provisional application No. 61/477,679, filed on Apr. 21, 2011.

(51) Int. Cl.
*C08F 6/00* (2006.01)
*C08G 73/02* (2006.01)

(52) U.S. Cl.
CPC ................................. *C08G 73/0286* (2013.01)
USPC ........... 528/480; 524/608; 524/812; 524/846; 528/486; 528/487

(58) Field of Classification Search
USPC ........ 524/422, 608; 528/480, 486, 487, 328.3
See application file for complete search history.

(56) References Cited

U.S. PATENT DOCUMENTS

| | | | |
|---|---|---|---|
| 2,926,154 A | 2/1960 | Keim et al. | |
| 3,086,961 A | 4/1963 | House et al. | |
| 3,700,623 A | 10/1972 | Keim | |
| 3,772,076 A | 11/1973 | Keim | |
| 4,233,417 A | 11/1980 | Van Eenam | |
| 4,298,639 A | 11/1981 | Van Eenam | |
| 4,298,715 A | 11/1981 | Van Eenam | |
| 4,341,887 A | 7/1982 | Buriks et al. | |
| 4,853,431 A | 8/1989 | Miller | |
| 5,019,606 A | 5/1991 | Marten et al. | |
| 5,256,727 A | 10/1993 | Dulany et al. | |
| 5,510,004 A | 4/1996 | Allen | |
| 5,614,597 A | 3/1997 | Bower | |
| 5,644,021 A | 7/1997 | Maslanka | |
| 5,972,691 A | 10/1999 | Bates et al. | |
| 6,429,267 B1 | 8/2002 | Riehle | |
| 7,081,512 B2 | 7/2006 | Riehle | |
| 7,189,307 B2 | 3/2007 | Goulet et al. | |
| 7,868,071 B2 | 1/2011 | Luo et al. | |
| 2004/0266984 A1 | 12/2004 | Riehle | |
| 2007/0137821 A1 | 6/2007 | Riehle et al. | |
| 2009/0036577 A1 * | 2/2009 | Luo et al. .......................... 524/56 |

OTHER PUBLICATIONS

International Search Report and Written Opinion of the International Searching Authority for PCT/US2012/033938 mailed Oct. 29, 2012.

* cited by examiner

*Primary Examiner* — Gregory Listvoyb
(74) *Attorney, Agent, or Firm* — Ram W. Sabnis

(57) ABSTRACT

A novel process for producing a polyamidoamine-epihalohydrin resin composition comprises (a) reacting a polyamidoamine with epihalohydrin to obtain a reaction mixture comprising a polyamidoamine-epihalohydrin resin; (b) adding a first acid to the reaction mixture obtained in step (a) to obtain an acid treatment composition; (c) adding a base to the acid treatment composition in step (b) to obtain a base treatment composition; and (d) adding a second acid to the base treatment composition in step (c) to obtain a polyamidoamine-epihalohydrin resin composition; wherein the polyamidoamine-epihalohydrin resin composition obtained in step (d) has less than about 700 ppm of dihalopropanol (DHP) and 3-halopropanediol (HPD).

25 Claims, No Drawings

POLYAMIDOAMINE-EPIHALOHYDRIN RESINS, METHOD OF MANUFACTURE, AND USES THEREOF

BACKGROUND

This invention relates to the manufacture of resins that are particularly useful in the paper and wood industry, and in particular to stabilized polyamidoamine-epichlorohydrin resins, aqueous solutions thereof, and use in products such as paper products.

Wet strength resins are often added to paper and paperboard at the time of manufacture. In the absence of wet strength resins, paper normally retains only 3% to 5% of its strength after being wetted with water. However, paper made with wet strength resin generally retains at least 10% to 50% of its strength when wet. Wet strength is useful in a wide variety of paper applications, such as toweling, milk and juice cartons, paper bags, and liner board for corrugated containers. Wet strength resins can also provide increased dry strength to paper.

Polyamidoamine-epichlorohydrin resins are also used as creping adhesives. In the manufacture of some paper products such as facial tissue, bathroom tissue, or paper towels, the paper web is conventionally subjected to a creping process in order to give it textural characteristics such as softness and bulk. The creping process typically involves adhering a web (a cellulose web in the case of paper) to a rotating creping cylinder, e.g., the apparatus known as a Yankee dryer, and then dislodging the adhered web with a doctor blade. The impact of the web against the doctor blade ruptures some of the fiber-to-fiber bonds within the web and causes the web to wrinkle or pucker.

Polyamidoamine-epichlorohydrin (PAE) resins are widely used as wet strength resins. These resins can be manufactured by the reaction of polyamidoamine with epichlorohydrin under basic conditions. The resulting resin is then contacted with an acid to stabilize the product. However, the acid also hydrolyzes unreacted epichlorohydrin to species such as 1,3-dichloropropanol (1,3-DCP), 2,3-dichloropropanol (2,3-DCP), and 3-chloropropanediol (CPD). Other chlorine-containing contaminants can also be present.

These epichlorohydrin hydrolysis products are also known as "epichlorohydrin byproducts" or "organic halogenated byproducts." Present commercial polyamidoamine-epichlorohydrin resins can contain 0.5 to 10 wt % (on a dry basis) of 1,3-DCP, 2,3-DCP, and CPD.

Environmental pressures to produce resins with lower levels of absorbable organic halogen (AOX) species have been increasing. AOX species include epihalohydrin and its hydrolysis products, for example, 1,3-DCP, 2,3-DCP, and CPD, as well as organic halogen bound to the polymer backbone. Production of resins with reduced levels of epihalohydrin and its byproducts has been the subject of much investigation, as described for example, in U.S. Pat. Nos. 7,081,512; 5,256,727; and 5,972,691. Polyamidoamine-epichlorohydrin wet strength resins have limited shelf life and stabilization is critical for providing effective performance properties over storage time. Techniques to reduce chlorinated monomer byproducts have been shown to negatively impact storage stability, and this effect is more pronounced for resin products manufactured at high resin solids. Stabilization of PAE resins has also received much attention, as described for example, in U.S. Patent No. However, there is a continuing need for methods of making polyamidoamine-epihalohydrin resins that have low levels of epihalohydrin and its hydrolysis products, while also providing improved storage stability at higher resin solids.

SUMMARY

The above-described continuing need is met by a process for producing a low 1,3-DCP, stabilized polyamidoamine-epihalohydrin aqueous resin composition, comprising treating a polyamidoamine-epihalohydrin resin mixture containing halogenated epichlorohydrin by-products with formic acid to obtain a formic acid-treated resin mixture; adding a base to the formic acid-treated resin mixture to obtain an formic acid/base-treated resin mixture at alkaline pH; and adding a second acid to the formic acid-base reaction mixture to obtain a product polyamidoamine-epihalohydrin resin composition having less than about 700 ppm of halogenated epihalohydrin byproducts, specifically 1,3-dichloropropanol.

The order of addition of the formic acid and base can be reversed, such that a polyamidoamine-epihalohydrin resin mixture containing halogenated epichlorohydrin by-products is treated with an inorganic base to generate an alkaline pH; formic acid is added to the base treated resin mixture to obtain a base/formic acid treated reaction mixture at alkaline pH; and adding a second acid to the base/formic acid treated reaction mixture to obtain a product polyamidoamine-epihalohydrin resin composition having less than about 700 ppm of halogenated epihalohydrin byproducts, specifically 1,3-dichloropropanol.

In another embodiment a process for producing a low 1,3-DCP, stabilized polyamidoamine-epihalohydrin aqueous resin composition comprises treating a polyamidoamine-epihalohydrin resin mixture containing halogenated epichlorohydrin by-products with sodium formate, adding an inorganic base such as sodium hydroxide, and then an organic base such as diethanolamine [primary, secondary, and tertiary alkanolamines can be used; diethanolamine is preferred] to the sodium formate/alkanolamine-treated resin mixture; and adding a second acid to the formate/alkanolamine-treated reaction mixture to obtain a product polyamidoamine-epihalohydrin resin composition having less than about 700 ppm of halogenated epihalohydrin byproducts, specifically 1,3-dichloropropanol.

In another embodiment a process for producing a low 1,3-DCP, stabilized polyamidoamine-epihalohydrin aqueous resin composition comprises treating a polyamidoamine-epihalohydrin resin mixture containing halogenated epichlorohydrin by-products with the treatment process above, and then adding a non-aldehyde, low molecular weight, non-ionic water soluble organic compound that is reactive with the cationic moiety of the resin (the azetidinium group). Another option is to add an inorganic complexing metal salt, such as aluminum sulfate. The overall result is a significant improvement in the storage stability of the cationic PAE resin, maintained at a relatively high solids content, without an undesired loss in wet strengthening efficiency.

In another embodiment, a process for producing a low 1,3-DCP, stabilized polyamidoamine-epihalohydrin aqueous resin composition comprises treating a polyamidoamine-epihalohydrin resin mixture containing halogenated epichlorohydrin by-products with formic acid to obtain a formic acid-treated resin mixture; adding an inorganic base such as sodium hydroxide and then an organic base such as diethanolamine primary, secondary, and tertiary alkanolamines can be used; diethanolamine is preferred] to the formic acid-treated resin mixture to obtain a formic acid/base-treated resin mixture; and adding a second acid to the formic acid-base treated reaction mixture to obtain a product polyamidoamine-epihalohydrin resin composition having less than about 700 ppm of halogenated epihalohydrin byproducts, specifically 1,3-dichloropropanol. The order of addition of the formic acid and inorganic base can be reversed, such that a polyamidoamine-epihalohydrin resin mixture containing halogenated epichlorohydrin by-products is treated with base to generate an alkaline pH; formic acid is added to the base treated resin mixture to obtain a base/formic acid treated reaction mixture at alkaline pH; an alkanolamine is added to the base/formic acid treated resin mixture; and adding a second acid to the base/formic acid treated reaction mixture to obtain a product polyamidoamine-epihalohydrin resin composition having less than about 700 ppm of halogenated epihalohydrin byproducts, specifically 1,3-dichloropropanol.

In another embodiment, a process for producing a low 1,3-DCP, stabilized polyamidoamine-epihalohydrin aqueous resin composition comprises treating a polyamidoamine-epihalohydrin resin mixture containing halogenated epichlorohydrin byproducts with a base and diethanolamine to obtain a base/diethanolamine-treated resin mixture; and adding a second acid to the base/diethanolamine-treated reaction mixture to obtain a product polyamidoamine-epihalohydrin resin composition having less than about 700 ppm of halogenated epihalohydrin byproducts, specifically 1,3-dichloropropanol.

Polyamidoamine-epihalohydrin resin compositions having less than about 700 ppm of halogenated epihalohydrin byproducts, specifically 1,3-dichloropropanol obtained by the above methods is also described.

The features and advantages of the methods and compositions described herein are further illustrated by the below detailed description, which is non-limiting.

DETAILED DESCRIPTION

It has been surprisingly found that a polyamidoamine-epihalohydrin resin that has low levels of epihalohydrin byproducts can be obtained using a novel manufacturing process. In one aspect of the process, a reaction mixture comprising a polyamidoamine-epihalohydrin resin is treated with formic acid, followed by treatment with a base before quenching the reaction with a second acid. In another aspect of the process, a reaction mixture comprising a polyamidoamine-epihalohydrin resin is treated with formic acid, followed by treatment with a base and diethanolamine before quenching the reaction with a second acid. In either of these processes, the reaction mixture comprising the polyamidoamine-epihalohydrin resin can be acid stabilized prior to treatment with the formic acid. In still another aspect of the process, a reaction mixture comprising a polyamidoamine-epihalohydrin resin is treated with a base and diethanolamine, followed by quenching the reaction with a second acid, in the absence of any prior acid stabilization or formic acid treatment.

By balancing treatment conditions, including pH, temperature, starting viscosity, and solids content of polyamidoamine-epihalohydrin resin compositions, polyamidoamine-epihalohydrin resins having low levels of halogenated contaminants such as 1,3-DCP, 2,3-DCP, and 3-CPD can be obtained. The process is particularly advantageous in that the viscosity of the resin can be readily adjusted and controlled during the manufacturing process, thereby providing resins of consistent viscosity, with higher production throughput. It has further been found that controlling the pH of the reaction mixture during the base treatment in any of the foregoing embodiments provides additional process advantages. Resins of both low and high solid content can be produced as desired. Such resins further have improved storage stability and wet strengthening performance.

A variety of processes are known for making cationic thermosetting wet strengthening polymers or resins, in particular polyamidoamine-epihalohydrin (i.e., PAE) resins for use with the stabilization procedures described herein. The thermosetting character of these polymers is typically due to the presence of azetidinium moieties (and moieties that are capable of forming azetidinium moieties) and/or quaternary ammonium epoxide moieties distributed along the backbone of the polymer chain. In general, manufacture of a PAE resin mixture first comprises production of a polyamidoamine, followed by reacting the polyamidoamine and an epihalohydrin in an aqueous solvent to obtain a polyamidoamine-epihalohydrin reaction mixture containing unreacted epihalohydrin and its hydrolysis products. The starting materials and reaction conditions are selected so as to produce a reaction mixture of the desired viscosity and containing a polyamidoamine-epihalohydrin resin of the desired molecular weight, and are readily determined by one of ordinary skill in the art without undue experimentation, based the guidelines herein. In addition, exemplary procedures for preparing polyamidoamines and polyamidoamine-epihalohydrin resins are described U.S. Pat. Nos. 2,926,154, 3,086,961, 3,700,623, 3,772,076, 4,233,417, 4,298,639, 4,298,715, 4,341,887, 4,853,431, 5,019,606, 5,510,004, 5,644,021, 6,429,267 and 7,189,307.

Briefly described, the process has two primary steps: the first step comprises forming a polymer backbone. In the case of a PAE resin a polyamide (e.g., a polyamidoamine) backbone is formed by reacting a dicarboxylic acid, a dicarboxylic acid halide, and/or a diester thereof with a polyalkylene polyamine. In the case of a thermosetting poly(diallylamine) polymer, the polymer backbone can be formed by the free radical homopolymerization of the diallylamine.

Dicarboxylic acids suitable for use in preparing the polyamides include saturated aliphatic dicarboxylic acids, preferably containing from about 3 to 8 carbon atoms. The reactions generally occur at a temperature of about 40° C. to about 250° C.

Suitable polyalkylene polyamines contain two to four alkylene groups having two to four carbon atoms, two primary amine groups, and one to three secondary amine groups. Suitable polyalkylene polyamines for preparing the polyamidoamine resin include polyethylene polyamines, polypropylene polyamines, polybutylene polyamines, and the like. Examples of suitable polyalkylene polyamines for making PAE resins include diethylenetriamine, triethylenetetraamine, dipropylenetriamine and the like, or mixtures thereof. Polyamines such as those in the JEFFAMINE® family (Huntsman, LLC) may also be used.

Generally, sufficient dicarboxylic acid, or the diester or acid halide thereof, is supplied to react substantially completely with the primary amine groups on the polyalkylene polyamine, but the amount of acid, diester or acid halide is insufficient to react with secondary amine groups to any substantial extent. Thus, when using a polyalkylene polyamine having two primary amine groups, an appropriate mol ratio of polyalkylene polyamine to dicarboxylic acid (or diester or acid halide) usually will be between about 0.9:1 to about 1.2:1. Higher and lower mole ratios may on occasion be used with acceptable results. Normally, the reaction of polyamidoamines prepared at a mol ratio significantly below about 0.9:1 with an epihalohydrin leads to gelled products or products having a more pronounced tendency to gel, while the reaction of polyamides prepared at a mol ratio significantly above 1.2:1 typically yields products having a low molecular weight. These lower molecular weight products typically do not exhibit a sufficient degree of wet-strengthening capacity when later reacted with an epihalohydrin.

The particular polyamidoamine is selected based on the desired properties of the resin product, for example provision of wet strength during paper processing. In one embodiment, a polyamidoamine reactant is prepared by reacting adipic acid and diethylenetriamine (DETA) at a molar ratio of less than about 1.0:1.0.

The so-prepared backbone polymer (i.e., the polyamidoamine) is then reacted in a second step in an aqueous mixture with an epihalohydrin, usually under alkaline condition. This reaction serves to build the PAE molecular weight and impart both the cationic nature and thermosetting character to the PAE resin.

The solids content of the polyamidoamine reactant is generally about 10 wt % to about 60 wt %, or more specifically, about 30 wt % to about 55 wt %, based on the total weight of the reaction mixture. In one embodiment the resulting polyamidoamine is diluted with water to obtain a composition that has a solids content of about 40 wt % to about 50 wt % before being used to react with epihalohydrin.

Suitable epihalohydrins include, but are not limited to epichlorohydrin and epibromohydrin. In one embodiment, the epihalohydrin is epichlorohydrin. Sufficient epihalohydrin, e.g., epichlorohydrin, is used to convert most, if not all secondary amine groups of the polyamidoamine to tertiary amine groups and/or quaternary ammonium groups including azetidinium groups. Generally, from about 0.5 moles to about 1.8 moles of epichlorohydrin are used per mole of polyamidoamine secondary amines. Preferably, about 0.80 mole to about 1.7 moles of epichlorohydrin are used per mole of polyamidoamine secondary amines. Typically, PAE resin wet strengthening efficiency is better at the higher epichlorohydrin to polyamidoamine secondary amine mole ratios. As understood by those skilled in the art, if the mole ratio is too high instability problems may be encountered and contributes to undesirable loss of and potential pollution by the epihalohydrin. As above, selection of an appropriate mole ratio is within the skill of the art and the present invention is not limited to any particular range. Once the epihalohydrin-polyamidoamine reaction has proceeded to the desired extent, further reaction is quenched with the combination of cooling and adding an acid to reduce the pH of the reaction mixture usually to about 3.0.

The reaction between the polyamidoamine and the epihalohydrin generally takes place under alkaline pH conditions, for example, at a pH of about 7 to about 11, or more specifically, about 8 to about 10. The temperature of the reaction is generally about 20° C. to about 100° C., or more specifically, about 45° C. to about 70° C. The reaction time is generally about 1 to about 6 hours, or more specifically, about 2 to about 5 hours.

Generally, in the case of functionalizing the polyamidoamine, the reaction is allowed to proceed until the viscosity of the aqueous PAE resin system has reached a desired viscosity, e.g., often measured as a Gardner-Holdt viscosity. The Gardner-Holdt viscosity of the cationic PAE thermosetting resin usually should be at least a C and preferably for resins having about a 25% solids content or higher is at least an I to a K. A Gardner-Holdt viscosity of about a K to an M may often be preferred for a resin solution containing 20 to 25% solids. As recognized by those skilled in the art, Gardner-Holdt viscosities also can be converted to other measures of viscosity. Although dependent on specific reaction conditions, as noted above the time required to prepare a PAE resin of the desired viscosity generally will be about 3 to 6 hours. For resins of even higher solids content, a higher Gardner-Holdt viscosity would be appropriate. For example, for a 50% solids content resin, the Gardner-Holdt viscosity should at least be an M and preferably is at least a Z. As used herein, resin solids content is synonymous with resin non-volatile content.

The PAE resin mixture to be stabilized as disclosed herein is generally prepared at a solids content of between about 10 and 40% by weight and normally the solids content falls in the range of 10 to 30%. In most cases a solids content of about 25% will be the target.

The PAE reaction mixture comprising the PAE resin of the desired solids content and viscosity can optionally be first stabilized with an acid as is known in the art to provide an acid-stabilized reaction mixture comprising the polyamidoamine-epihalohydrin resin [2-Step process]. Alternatively, The PAE reaction mixture can be prepared by reacting the pre-formed polyamidoamine prepolymer with epihalohydrin to a desired viscosity end-point, and then not acidifying the reaction, but proceeding immediately into the acid/base treatment process to reduce 1,3-DCP. In this approach the entire reaction sequence is carried out in a "1-reactor process". This eliminates the need for acidification to halt polymerization, and ultimately requires less acid and base to provide a finished resin product with reduced levels of 1,3-DCP.

Organic or inorganic acids can be used, for example acetic acid, formic acid, oxalic acid, citric acid, hydrochloric acid, sulfuric acid, urea-sulfate, methanesulfonic acid, nitric acid, or phosphoric acid. A combination comprising two or more different acids can be used. In one embodiment, sulfuric acid is used. The amount of the acid used in the treatment is about 0.05 wt % to about 10 wt %, or more specifically, about 1 wt % to about 5 wt %, based on the total weight of liquid product.

During the acid treatment, the pH of the reaction mixture is maintained at about 1.0 to about 4.0, more specifically, about 1.8 to about 3.5, even more specifically, from about 2.5 to about 3.5. The pH values are measured at about 25° C. The pH is dependent on several factors, including the desired viscosity of the resin. As the acid treatment pH increases within the disclosed ranges, the viscosity tends to increase. Without wishing to be bound by theory, this pH and viscosity relationship during the acid treatment process is due to the balance of the crosslinking reactions with the reactions that degrade polymer viscosity. It can be desirable that the pH value be maintained at or near the starting acidic pH during acid treatment by periodic or continuous addition of the first acid.

The first acid treatment is generally performed at a temperature of about 10° C. to about 55° C., more specifically about 20° C. to about 40° C., even more specifically, about 25° C. The first acid treatment step is conducted for a length of time effective to produce a reaction mixture of the desired viscosity and halogen-containing contaminant level, for example about 0 minutes to about 30 minutes, or more specifically, about 5 minutes to about 15 minutes. The treatment time and treatment temperature are generally inversely related. As the treatment temperature decreases, the treatment time is generally increased.

In accordance with one aspect of the invention, the PAE resin mixture (acid-stabilized or not) is treated with formic acid, followed by a base.

The amount of the formic acid used in the treatment is about 0.05 wt % to about 10 wt %, or more specifically, about 0.05 wt % to about 1.0 wt %, based on the total weight of liquid resin.

Again, during the formic acid treatment, the pH of the reaction mixture is maintained at about 2.0 to about 8.0, more specifically, about 2.5 to about 7.5. The pH values are measured at about 25 °C. It can be desirable that the pH value be maintained at or near the starting acidic pH during formic acid treatment by periodic or continuous addition of the first acid.

The formic acid treatment is generally performed at a temperature of about 10° C. to about 55° C., more specifically about 20° C. to about 40° C., even more specifically, about 25 °C. The formic acid treatment step is conducted for a length of time effective to produce a reaction mixture of the desired viscosity and halogen-containing contaminant level, for example about 0 minutes to about 60 minutes, or more specifically, about 5 minutes to about 15 minutes.

After the formic acid treatment, a base is added to the formic acid-treated reaction mixture to obtain an acid/base-treated reaction mixture. During the base treatment, it is hypothesized that the formic acid is converted to a salt, which promotes epihalohydrin byproducts to benign reaction products. In particular, byproducts such as 1,3-dihalopropanol (1,3-DHP), 2,3-dihalopropanol (2,3-DHP) and 3-halopropanediol (HPD) are decreased, and even more specifically, the level of 1,3-DCP, and 2,3-DCP, are decreased.

Organic and inorganic bases can be used for the base treatment, for example alkali metal hydroxides, alkali metal carbonates, alkali metal bicarbonates, alkali metal phosphates, alkali metal alkoxides, alkali metal sulfides, alkaline earth metal hydroxides, alkaline earth metal sulfides, alkaline earth metal alkoxides, ammonia, organic amines such as trialkylamines wherein each alkyl group has 1 to 6 carbon atoms, akanolamines wherein each alkyl group has 1 to 6 carbon atoms, dialkanolamines wherein each alkyl group has 1 to 6 carbon atoms, and tetraalkylammonium hydroxides wherein each alkyl group has 1 to 6 carbon atoms. Specific bases include a dialkanolamine, sodium phosphate, potassium phosphate, lithium hydroxide, sodium hydroxide, potassium hydroxide, sodium carbonate, and potassium carbonate. A combination comprising two or more bases can be used.

In one embodiment, the base is sodium hydroxide, potassium hydroxide, ammonium hydroxide, diethanolamine, or a combination comprising at least one of the foregoing bases. In another embodiment, the base is sodium hydroxide.

The amount of the base used in the treatment is about 1 wt % to about 20 wt %, or more specifically, about 2.5 wt % to about 7.5 wt %, based on the total weight of liquid resin.

In still another embodiment, it has unexpectedly been found that use of diethanolamine lowers residual DHP levels compared to other bases, in particular other organic amines. In addition, use of diethanolamine improves process stability during base treatment, by decreasing the reaction rate, thereby allowing greater control over the process. This reduces the possibility of gelation of the reaction, and improves ease of manufacture. Such improvements are not observed when other organic amines, such a monoethanolamine, and triethanolamine are used. Diethanolamine can be used alone under alkaline conditions. In one embodiment, the formic acid-treated reaction mixture is treated with an inorganic base (such as sodium hydroxide), followed by addition of diethanolamine.

The amount of the diethanolamine used in the treatment is about 0.1 wt % to about 10 wt %, or more specifically, about 0.5 wt % to about 5 wt %, based on the total weight of the liquid resin.

In another aspect of the stabilization process described herein, a PAE reaction mixture is treated with the base/diethanolamine alone, i.e., without any prior acid stabilization or formic acid treatment. It is highly surprising that base/ethanolamine treatment is effected to produce highly stable resins with low levels of epihalohydrin by-products in the absence of acid stabilization or formic acid treatment.

In any of the foregoing embodiments, careful choice of the reaction conditions, allows balancing of the rate of the crosslinking reactions that increases viscosity with the rate of the polymer backbone hydrolysis reactions, which decreases viscosity, to predictably obtain desired viscosity. Viscosity is a measure of the quality of the resin. A resin with too high viscosity will have poor gelation stability. A resin with too low viscosity will result in a resin with lower wet strength efficiency. The viscosity of the resin composition can be increased or decreased from a starting viscosity during the base treatment, and it can remain substantially the same depending upon desired viscosity and reaction conditions as noted above. It can be desirable to balance or minimize other reactions, such as polymeric breakdown or molecular weight increase, such that the reaction mixture is held at a viscosity that enables the production of a desired viscosity resin. For example, if the viscosity of the reaction mixture is increasing at a rate that is higher than desired, the temperature can be lowered. As temperature increases, the rate of viscosity rise increases. The viscosity of the base treatment composition generally increases as the treatment time increases. In general, increasing the temperature of the reaction will decrease the time needed for the reaction. Higher solids content generally results in shorter base treatment time. Generally, more base is used with higher solids mixtures to obtain the desired reduction of halogenated species.

More specifically, the pH of the reaction mixture during base treatment can vary between about 7 to about 11.5, or more specifically, about 8.5 to about 10.5, or even more specifically, about 10. The pH values are measured at about 25° C. It can be desirable to allow the pH to decrease during the base treatment. A typical pH decrease observed during the base treatment is a starting pH of 11.5 and a decrease to 8.5.

In one embodiment, the pH of the reaction mixture during base treatment is monitored and the base is batch-wise or continuously added so as to maintain the pH of the reaction mixture at 9.5 to 11, specifically 10 to 10.5 during addition. Again, careful maintenance of the appropriate pH allows better control over the degree of crosslinking and molecular weight (and the viscosity) of the resin.

The temperature of the base treatment can be about 10° C. to about 50° C., more specifically, about 20° C. to about 40° C., even more specifically, about 25 °C.

Base addition and reaction in the presence of the base is continued until the desired resin viscosity and decrease in halogenated contaminants is achieved. In a particularly advantageous feature, it has been found that both the desired resin viscosity and lowered levels of halogenated contaminants is achieved at about the same time, obviating the need to continue treatment past the point of the desired resin viscosity. In general, the treatment times are about 5 to about 120 minutes, or more specifically, about 15 to about 100 minutes, or even more specifically, about 30 to about 90 minutes.

The base treatment is stopped by adding a quenching acid to quench the reaction once a target viscosity is achieved, to provide the product polyamidoamine-epihalohydrin resin compositions. In one embodiment, the target viscosity is an "EF" Gardner Holdt viscosity.

Organic or inorganic acids can be used as the quenching acid, for example formic acid, acetic acid, oxalic acid, citric acid, hydrochloric acid, sulfuric acid, methanesulfonic acid, nitric acid, or phosphoric acid. A combination of two or more acids can be used. In one embodiment, the second acid is a combination of formic acid and sulfuric acid. The formic acid and sulfuric acid can be used in a molar ratio of about 0.2:1.0 to about 1.5:1.0 of formic acid:sulfuric acid.

The amount of the quenching acid depends on the starting pH of the reaction mixture and the desired pH value of the composition. In general, the addition of the second acid lowers the pH of the resulting composition to about 1.0 to about 5.0, more specifically, about 2.0 to about 5.0, or even more specifically, from about 2.0 to about 4.0, or still more specifically, from about 2.5 to about 3.0. The pH values are measured at about 25° C. It can be desirable that the pH value be maintained at or near the starting acidic pH during the quench by periodic or continuous addition of the second acid.

Quenching is generally performed at a temperature of about 10° C. to about 55° C., more specifically, about 20° C. to about 40° C., or even more specifically, about 25° C. The treatment is generally about 1 to about 60 minutes, or more specifically, about 5 to about 15 minutes.

The product polyamidoamine-epihalohydrin aqueous resin compositions obtained using the treatment process disclosed herein have low initial levels of halogenated epihalohydrin byproducts, in particular dihalopropanols (DHP) and HPD, even more particularly dichloropropanols (DCP) and hydroxychloropropanols (HCD). As is known in the art, 1,3-DCP is the predominant hydrolysis product in polyamidoamine-epihalohydrin resins. CPD is generally present in amounts of up to about 10% of the levels of 1,3-DCP, while 2,3-DCP is generally present in amounts of about 1% of the level of 1,3-DCP. Both 1,3-DCP and CPD concentrations can be accurately determined by $C^{13}$ NMR and GC measuring techniques as described in more detail below. Because these are the main epichlorohydrin byproducts, it is generally accepted that they reflect the total levels of halogenated byproducts in the PAE resin compositions.

The product polyamidoamine-epihalohydrin resin composition manufactured as described above has an initial combined level of 1,3-DHP and HPD, specifically 1,3-DCP and CPD, of less than about 700 parts per million (ppm), more specifically less than about 500 ppm, based the liquid resin.

The product polyamidoamine-epihalohydrin resin compositions also have improved storage stability. In one embodiment, the product polyamidoamine-epihalohydrin resin composition has an increase in the combined level of 1,3-DHP and HPD, specifically 1,3-DCP and HCD, of less than about 1000 parts per million (ppm), or more specifically, less than about 100, or even more specifically, less than about 10 ppm.

The product polyamidoamine-epihalohydrin resin compositions can further have reduced levels of absorbable organic halogen (AOX). The present process can reduce the AOX content to less than about 75%, or more specifically, less than about 60%, or even more specifically, less than about 50%, of the initial value of the AOX content in the untreated resin on an equal solids basis. A Mitsubishi Kasei Corporation instrument (model TOX-10.SIGMA.) can be used for the AOX analysis, using the procedure described in the operating manual.

Additional stabilizing compounds can be added to the composition to further stabilize the composition. A useful additional stabilizer includes certain non-aldehyde, low molecular weight, non-ionic, water soluble organic stabilizing compounds, optionally in combination with a water soluble, inorganic complexing metal salt. These stabilizers are described in U.S. application Ser. No. 11/830,426. Such non-aldehyde, low molecular weight (i.e., a molecular weight below about 5000 Daltons, specifically below about 1000 Daltons, more specifically below about 300 Daltons), non-ionic, water soluble organic stabilizing compounds include (a) water soluble tertiary amines, such as triethanolamine, 2-dimethylamino ethanol, and aminopropyl diethanolamine, and the like; water soluble amides, and especially water soluble primary amides such as adipamide $NH_2C(O)(CH_2)_4C(O)NH_2$, thiourea $(NH_2C(S)NH_2)$, lower molecular weight urea-formaldehyde oligomers, urea $(NH_2C(O)NH_2)$ and water soluble polyamine-urea adducts, such as the urea adduct with 3,3'-diamino-N-methyldiproplyamine, i.e., $(NH_2C(O)N(H)-(CH_2)_3-N(CH_3)-(CH_2)_3N(H)C(O)NH_2)$, and the like; lower molecular weight carbohydrates, including various monosaccharides, disaccharides, trisaccharides, and polysaccharides; and lower molecular weight polyalcohols (polyols) including glycerol, sorbitol, polyvinyl alcohol and various other polyols.

Generally, the amount of added low molecular weight, non-aldehyde, non-ionic, water soluble organic stabilizing compound should not be significantly above a stoichiometric equivalent of, or a slight stoichiometric excess of the molar amount of the epihalohydrin used in the synthesis of the PAE resin. In most cases, an amount of the low molecular weight, non-aldehyde, non-ionic, water soluble organic stabilizing compound of from about 0.1% to about 25% by weight based on the weight of the PAE resin solids, and more usually 1 to 15% by weight. On a resin weight basis, applicants have determined, for example, that when urea is used alone as the low molecular weight, non-ionic, water soluble organic stabilizing compound, the urea can be beneficially added in an amount of 0.1 to 25% by weight of the PAE resin solids. Usually, an amount of urea between about 0.1 and 17% by weight of the PAE resin solids should be sufficient in most cases.

Combinations comprising one or more of the foregoing classes of stabilizers can be used. These stabilizing compounds can be used together with a water soluble, inorganic complexing metal salt. Suitable water soluble, inorganic complexing metal salts include the water soluble salts of a complexing metal having a electron charge density greater than that of sodium, such as aluminum, zinc, calcium, chromium, iron, magnesium and lithium. Suitable water soluble salts of these metals usually include the nitrates, sulfates, chlorides, and bromides. Representative water soluble, inorganic complexing metal salts thus include zinc chloride, magnesium chloride, calcium chloride, and lithium chloride. A particularly preferred water soluble, inorganic complexing metal salt is aluminum sulfate, also known as alum. Alum is a common paper chemical and thus is widely available. On a resin weight basis, the water soluble, inorganic complexing metal salt can be beneficially added in an amount up to about 10% by weight of the PPAE resin solids. Usually, an amount of the water soluble, inorganic complexing metal salt of up to about 5% by weight of the PAE resin solids is sufficient. Good results are generally obtained when the low molecular weight non-aldehyde, non-ionic stabilizing compound and the water soluble, inorganic complexing metal salt are used in combination.

The process disclose herein can be combined with one or more other treatment processes. The other treatments can be carried out both prior to or after the disclosed treatment. Non-limiting exemplary processes include removal of CPD-forming species using a basic ion exchange column, carbon adsorption, membrane separation, e.g., ultrafiltration, extraction with, e.g., ethyl acetate; or biodehalogenation.

The PAE resins obtained herein can be used for a variety of purposes, including paper processing, as wet strength resins, or creping aids. Other components can be added such as other ionic or non-ionic polymers, for example polyvinyl alcohol (PVA), polyethylene oxide (PEO), hydroxyethylcelluloses, poly diallyldimethyl ammonium chloride (DADMAC) polymers and the like, for wet strengthening applications. Use of the PAE resins described herein in such blends improves the storage stability of the blends, in particular gelation, even at higher solids contents.

The stabilized PAE resin compositions have the same utility as known thermosetting cationic materials as wet strengthening agents for paper materials, such as paper towels, absorbent facial tissue, absorbent bathroom tissue, napkins, wrapping paper, and other paperboard products such as cartons and bag paper. The stabilized PAE resin compositions can also be used in the same way. For example, preformed or partially dried paper can be impregnated by immersion in the aqueous cationic thermosetting resin, or by spraying the aqueous cationic thermosetting resin onto the paper. Alternatively, the aqueous PAE resin can be added to the water from which the paper is initially formed. Thereafter, the resin-treated paper is heated for about 0.5-30 minutes at temperatures of about 80 ° C. or higher to fully cure the thermosetting resin to a water-insoluble material. The present invention is not limited to any particular way of using the cationic resin.

As is common in the prior art, the cationic thermosetting resin or polymer, such as a thermosetting cationic PAE resin, usually is incorporated in the paper at an amount within the range of about 0.1-5% by dry weight of the paper. Even so, the use of any particular amount of cationic thermosetting resin is not a feature of the present invention. However, because of the stability enhancing effect of the present invention, cationic thermosetting resins and particularly cationic thermosetting PAE resins of a higher wet strengthening efficiency (higher initial viscosity) can often be prepared which may have the advantage of allowing a reduction of the amount of cationic thermosetting resin and particularly cationic thermosetting PAE resin needed to obtain a desired level of wet strength in the final paper product in any particular application. As understood by those skilled in the art, quantities of thermosetting cationic resin added to an aqueous paper stock or directly to a paper product will depend to a large extent on the degree of wet strength desired in the finished product and on the amount of cationic thermosetting resin actually retained by the paper fibers.

Paper products containing polyamidoamine-epichlorohydrin resins obtained herein contain low levels of HPD and are capable of being stored without undue formation of HPD. In one embodiment, the paper products have initial low levels of CPD, and can maintain low levels of CPD over an extended period of storage time. More specifically, paper products using the present process, made with a 1 wt % addition level of the resin composition, contain less than about 600 parts per billion (ppb), or more specifically, less than about 300 ppb, of CPD, when stored for periods of 2 weeks, or more specifically, 6 months, or even more specifically, one year.

In another embodiment, the paper products have an increase in CPD content over an extended period of storage time. More specifically, paper products using the instant process, made with a 1 wt % addition level of the resin composition, have an increase in CPD content of less than about 300 ppb, or more specifically, less than about 100 ppb, or even more specifically, less than about 50 ppb, of CPD when stored for periods as long as 2 weeks, more preferably as long as at least 6 months, and even more preferably as long as at least one year. In other words, the paper products according to the present invention have storage stability and will not generate excessive CPD content in paper products when stored for periods of 2 weeks, or more specifically, 6 months, or even more specifically, one year.

Thus, the resins obtained using the present treatment process give minimal formation of CPD in paper products, particularly those exposed to aqueous environments, especially hot aqueous environments, for example, tea bag, coffee filters, etc. Further examples of paper products include packaging board grade, and tissue and towel grade.

The following examples are provided to assist in the understanding of the invention and are not intended to be limitations on the scope of the disclosure. All reported percentages and parts of solid are on a dry weight basis, unless otherwise specifically indicated.

EXAMPLES

The following materials and methods were used in the Examples.

The amount of the CPD-forming species in the resins is determined using the following "Acid Test". A portion of the resin to be tested is charged into a container containing a stirrer. The pH is adjusted to 1.0 with 96 wt % sulfuric acid. The container is closed and placed in a 50° C. water bath and maintained at 50 ° C. with stirring. An aliquot is removed from the container at 24 hours, and submitted for gas chromatographic (GC) analysis in the manner described below to provide an indication of the CPD-forming species.

Gas Chromatography (GC) is used to determine epichlorohydrin and epichlorohydrin by-product 1,3-dichloropropanol (DCP) in the treated and untreated resins using the following method. The epichlorohydrin and DCP are extracted from the aqueous resin sample using diethyl ether. If flame ionization detector (FID) is used, the components are quantitated using phenol as the internal standard. The FID detector can be purchased from Hewlett-Packard (HP) as part of a Model 5890 GC.

The GC instrument is an HP Model 5890 series or equivalent. The column is a polar column such as DB-WAX (Megabore, J&W Scientific, Inc.) 30 m×0.25 mm internal diameter with 0.25 micron film thickness. The carrier gas is helium. The oven program can be 130° C. for 3.5 minutes, followed by ramping at 35° C./min to 200° C. and holding at 200° C. for 4 minutes. The FID uses hydrogen at 40 mL/min and air at 450 mL/min at 300° C.

To measure CPD in paper products, the paper product is extracted with water according to the method described in European standard EN 647, dated October 1993. Then 5.80 grams of sodium chloride is dissolved into 20 ml of the water extract. The salted aqueous extract is transferred to a 20 gram capacity Extrelut column and allowed to saturate the column for 15 minutes. After three washes of 3 ml ethyl acetate and saturation of the column, the Extrelut column is eluted until 300 ml of eluent has been recovered in about 1 hour. The 300 ml of ethyl acetate extract is concentrated to about 5 ml using a 500-ml Kuderna-Danish concentrating apparatus (if necessary, further concentrating is done by using a micro Kuderna-Danish apparatus). The concentrated extract is analyzed by GC using the procedure and instrumentation described above. Typically, an electrolytic conductivity detector (ELCD) or a halogen-specific detector (XSD) is used. Other sensitive detectors can also be used, e.g., electron capture detectors.

Example 1 describes the preparation of a low DCP "baseline", acidified PAE resin. The resin has a molar ratio of epichlorohydrin:amine of 0.96:1.0, and 21% solids. The resin is used as the reactant material in a stabilization process using sodium hydroxide, followed by acid quench as described in Example 3 of U.S. Pat. No. 7,081,512 (comparative Example 2 below), and in a stabilization process using formic acid, followed by sodium hydroxide treatment as described herein (Example 3 below).

Example 1

A 1-liter reactor was equipped with an overhead stirrer, a condenser, pH and temperature probes, stainless steel cooling coils, a heating mantle, and an equal pressure addition funnel. To the reactor was added 300.0 g (0.633 mole) of polyamidoamine prepolymer (reaction product of DETA:adipic acid, 0.97:1.0 mole ratio) at 45% solids. The pH of the prepolymer was adjusted to 10.0 by the addition of 3.8 g of 25% NaOH. The reaction mixture was cooled to 20° C. by use of cooling coils, and epichlorohydrin (56.3 g, 0.608 mole), was added over 90 minutes using the addition funnel. The reaction temperature was maintained at 20° C. with constant cooling during the epichlorohydrin addition. Cooling was discontinued and the reaction was allowed to exotherm to 30° C. and was held at this temperature for an additional 4 hours, at which time the pH had dropped to 8.2. To the reaction mixture was added 279.2 g water, and the reaction was heated to 45° C. over a 30-minute period. The reaction was held at 45° C. and the viscosity was allowed to advance to a BC Gardner-Holdt bubble tube viscosity. To the reaction mixture was charged 325.3 g of water, and the temperature was raised to 60° C. over 20 minutes. The viscosity of the reaction was AlA Gardner-Holdt. The viscosity was increased to a C Gardner-Holdt over 1.5 hours at 60° C., and the reaction mixture was then cooled to 50° C. The viscosity was then advanced over 1 hour to the final end-point viscosity of EF Gardner-Holdt, at which point the polymerization was quenched by the addition of 9.48 g of 96% sulfuric acid. The reaction was cooled to 25° C. and was diluted to a final concentration of 21% total solids. The resin product had a Brookfield viscosity of 87 cP, pH 3.08, a charge density of 1.80 meq+/g solid, an azetidinium ion ratio of 0.59, and contained 850 ppm DCP on liquid basis at 21% (GC-Mass Spec), (4,048 ppm on dry solid basis).

Example 2

A 1-liter reactor was equipped with an overhead stirrer, a condenser, pH and temperature probes, stainless steel cooling coils, a heating mantle, and an equal pressure addition funnel. To the reactor was added 517.9 g of acid stabilized, low DCP resin from Example 1, followed by 282.2 g of water, adjusting the polymer concentration to 13.3%. The reaction mixture was heated to 40° C. and then 30.7 g of 25% NaOH was added over 5 minutes. At the finish of the NaOH addition the pH of the reaction mixture was 10.4. Initially the viscosity decreased, but the viscosity increased to the desired degree over a 30 minute period at 40° C., and the pH decreased to 9.2. The reaction was quenched to pH 3.0 by the addition of 7.1 g of 96% sulfuric acid. After 30 minutes at 60° C. the pH was reduced from 3.5 to 3.0 with 0.68 g of 96% sulfuric acid. After 60 minutes at 60° C. the pH was reduced from 3.4 to 3.0 with 0.47 g of 96% of sulfuric acid. After 90 minutes at 60° C. the pH was reduced from 3.4 to 3.0 with 0.46 g of 96% sulfuric acid. After 120 minutes at 60° C. the pH was reduced from 3.5 to 3.1 with 0.21 g of 96% sulfuric acid. At this point the reaction was cooled to 25° C. over 10 minutes, and then water was added to obtain a final concentration of 14%. The resin had a Brookfield viscosity of 45 cP, a charge density of 1.53 meq+/g, an azetidinium ion ratio of 0.55, and DCP level of 218 ppm liquid basis (1,557 ppm dry basis=61% reduction).

Example 3

A 1-liter reactor was equipped with an overhead stirrer, a condenser, pH and temperature probes, stainless steel cooling coils, a heating mantle, and an equal pressure addition funnel. To the reactor was added 600.0 g of acid stabilized, low DCP resin of Example 1, followed by 339.3 g of water to adjust the reaction concentration to 13.1% and pH of 3.1. Formic acid, 0.70 g, 90% concentration, was added and the reaction was heated to 40° C., and the pH was 2.7. 41.86 g of 25% NaOH was added over 5 minutes. At the finish of the NaOH addition the pH of the reaction mixture was 10.7. The viscosity increased to the desired degree over a 30 minute period at 40° C., and the pH decreased to 9.2. The reaction was quenched to pH 3.0 by the addition of 7.14 g of 96% sulfuric acid. After 30 minutes at 60° C. the pH was reduced from 3.5 to 3.0 with 0.68 g of 96% sulfuric acid. After 60minutes at 60° C. the pH was reduced from 3.4 to 3.0 with 0.47 g 96% of sulfuric acid. After 90 minutes at 60° C. the pH was reduced from 3.4 to 3.0 with 0.46 g of 96% of sulfuric acid. After 120 minutes at 60° C. the pH was reduced from 3.5 to 3.1 with 0.21 g of 96% sulfuric acid. At this point the reaction was cooled to 25° C. and diluted with water to 14.6%. The resin had a Brookfield viscosity of 45 cP, a charge density of 1.37 meq+/g, an azetidinium ion ratio of 0.55, and DCP level of 188 ppm liquid basis (1,288 ppm dry basis=68% reduction).

Example 4

This Example describes a one-step stabilization process of a PAE resin using sodium hydroxide/diethanolamine, wherein the pH of the stabilization held essentially constant at 10.5. The resin has an epichlorohydrin:amine mole ratio of 0.96:1:0. No acid cycle is used.

A 2-liter reactor was equipped with an overhead stirrer, a condenser, pH and temperature probes, stainless steel cooling coils, a NaOH feed line with a diaphragm pump and reservoir, a heating mantle, and an equal pressure addition funnel. To the reactor was added 581.8 g, 1.227 moles of polyamidoamine prepolymer at 45.5% solids (reaction product of DETA: adipic acid, 0.97:1.0 mole ratio). The pH of this material was then adjusted to 10.1 with 12.0 g of 25% NaOH over 5 minutes. The temperature of the reaction mixture was reduced to 20° C. and then 109.0 g, 1.178 moles epichlorohydrin was added over 90 minutes using an addition funnel, to provide a total reaction concentration of 53.7%. The reaction temperature was maintained at 20° C. with constant cooling during the epichlorohydrin addition. The cooling was then discontinued and the reaction was allowed to exotherm to 25 ° C. over 15 minutes and was held at this temperature for an additional 4 hours. To the reaction mixture was added 552.30 g water, and the reaction was heated to 55° C. over a 30 minute period. The reaction was held at 55 ° C. and the viscosity was allowed to advance to a BC Gardner-Holdt bubble viscosity. To the reaction mixture was charged 623.0 g of water, and the temperature was raised to 60° C. over 20 minutes. The viscosity of the reaction was AlA Gardner-Holdt. The viscosity increased to an AB Gardner-Holdt over 20 minutes at 60° C., and the reaction mixture was then cooled to 35° C. over 10 minutes.

To the reaction mixture at 35° C. was added 38.8 g of 25% NaOH, with the pH increasing to 10.5. Then 11.0 g of diethanolamine was added at once. The pH of the reaction mixture was maintained at pH 10.5 for 45 minutes by the continuous addition of 25% NaOH using the pumping apparatus and in-line pH/temperature compensation probe. The viscosity of the reaction mixture was allowed to advance to the desired viscosity end-point of EF Gardner-Holdt over the 45 minutes while maintaining the pH at 10.5 with constant NaOH feed. The polymerization was quenched by the addition of a blend of 90.5 g of 35% sulfuric acid and 10.6 g of 90% formic acid. The reaction was cooled to 25° C. and was diluted to a final concentration of 20.0% total solids. The resin product had a Brookfield viscosity of 147 cP, pH 2.81, and contained 141 ppm DCP on liquid basis at 20% (GC-Mass Spec), (705 ppm on dry solid basis), a charge density of +0.98 meq/g, and an azetidinium ion ratio of 0.45.

Example 5

This Example describes stabilization of a PAE resin using formic acid treatment, followed by sodium hydroxide then diethanolamine, wherein the pH of the stabilization held essentially constant at 10.5. The resin has an epichlorohydrin: amine mole ratio of 0.96:1:0 and a solids content of 22%. The PAE resin is not stabilized with acid prior to the base treatment.

A 2-liter reactor was equipped with an overhead stirrer, a condenser, pH and temperature probes, stainless steel cooling coils, a NaOH feed line with a diaphragm pump and reservoir, a heating mantle, and an equal pressure addition funnel. To the reactor was added 544.9 g, 1.163 moles of polyamidoamine prepolymer at 45.5% solids (reaction product of DETA: adipic acid, 0.97:1.0 mole ratio). The pH of this material was then adjusted to 10.2 with 8.3 g of 25% NaOH over 5 minutes. The temperature of the reaction mixture was reduced to 20° C. and then 103.5 g, 1.119 moles epichlorohydrin was added over 90 minutes using an addition funnel, to provide a total reaction concentration of 53.9%. The reaction temperature was maintained at 20 ° C. with constant cooling during the epichlorohydrin addition. The cooling was then discontinued and the reaction was allowed to exotherm to 25° C. over 15 minutes and was held at this temperature for an additional 4 hours. To the reaction mixture was added 537.1 g water, and the reaction was heated to 55° C. over a 30 minute period. The reaction was held at 55° C. and the viscosity was allowed to advance to a BC Gardner-Holdt viscosity. To the reaction mixture was charged 596.8 g of water, and the temperature was raised to 60° C. over 20 minutes. The viscosity of the reaction was A1A Gardner-Holdt. The viscosity was increased to a B Gardner-Holdt bubble over 30 minutes at 60° C., and the reaction mixture was then cooled to 30° C. over 10 minutes.

To the reaction mixture at 30° C. was added first 9.88 g of formic acid, with the pH of the reaction dropping from about 7.0 to 5.1. Then, 60.1 g of 25% NaOH was added over 5 minutes, with the pH of the reaction increasing to 10.6. Then 20.68 g of diethanolamine was added at once. The pH of the reaction mixture was maintained at pH 10.5 for 75 minutes by the continuous addition of approximately 27.0 g total of 25% NaOH, using the pumping apparatus and in-line pH/temperature compensation probe. The viscosity of the reaction mixture was allowed to advance to the desired viscosity end-point of EF Gardner-Holdt over the 75 minutes while maintaining the pH at 10.5 with constant NaOH feed. The polymerization was quenched by the addition of a blend of 86.6 g of 35% sulfuric acid and 10.1 g of 90% formic acid. The reaction was cooled to 25° C. and was diluted to a final concentration of 20.0% total solids. The resin product had a Brookfield viscosity of 120 cP, pH 2.85, azetidinium ion ratio of 0.47 and contained 213 ppm DCP on liquid basis at 20% (GC-Mass Spec), (1065 ppm on dry solid basis). (charge density not tested).

As used herein, the singular forms "a," "an," and "the" include plural referents unless the context clearly dictates otherwise. The endpoints of all ranges reciting the same characteristic or component are independently combinable and inclusive of the recited endpoint. The weight percentages of the solid materials are based on the dry weight of the compositions unless the context clearly dictates otherwise. Moreover, the use of the terms first, second, etc. do not denote any order or importance, but rather the terms first, second, etc. are used to distinguish one element from another. Throughout the specification and in the claims the term "about" is intended to encompass +or −5%. All patents and applications cited herein are each incorporated by reference in its entirety.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims.

In another embodiment, the invention is:

A process for producing a polyamidoamine-epihalohydrin resin composition, comprising:

treating a polyamidoamine-epihalohydrin resin mixture containing halogenated epihalohydrin byproducts with formic acid to obtain a formic acid-treated resin mixture;

treating the formic acid-treated resin mixture with a base to obtain an formic acid/base-treated resin mixture; and adding a quenching acid to the formic acid-base reaction mixture to obtain a product polyamidoamine-epihalohydrin resin composition having less than about 700 ppm of a combined amount of 1,3-dihydroxypropanol and 3-halopropanediol.

The process of the preceding paragraph, wherein the epihalohydrin is epichlorohydrin, and the 1,3-dihydroxypropanol and 3-halopropanediol are 1,3-dicloropropanol and 3-chloropropanol, respectively.

The process of any of the preceding paragraphs, wherein the polyamidoamine-epihalohydrin resin mixture has a solids content of about 10 wt % to about 50 wt %, based on the total weight of the mixture.

The process of any of the preceding paragraphs, wherein the polyamidoamine-epihalohydrin resin mixture is prepared by reacting adipic acid with diethylenetriamine at a molar ratio of less than about 1.0:1.0.

The process of any of the preceding paragraphs, further comprising treating the polyamidoamine-epihalohydrin resin mixture with a stabilizing acid prior to the treating with formic acid.

The process of any of the preceding paragraphs, wherein the stabilizing acid is sulphuric acid.

The process of any of the preceding paragraphs, wherein treating is with about 0.05 wt % to about 10.0 wt % of formic acid, based on the total weight [?] of the polyamidoamine-epihalohydrin resin mixture.

The process of any of the preceding paragraphs, wherein treating with the formic acid is at a pH of 2 to 8.

The process of any of the preceding paragraphs, wherein the formic acid-treated polyamidoamine-epihalohydrin resin composition has a solids content of about 10 wt % to about 35 wt %, based on the total weight of the composition in step (b).

The process of any of the preceding paragraphs, wherein the base comprises sodium hydroxide.

The process of any of the preceding paragraphs, wherein the base comprises diethanolamine.

The process of any of the preceding paragraphs, wherein the base comprises sodium hydroxide and diethanolamine.

The process of any of the preceding paragraphs, wherein the treating with a base is at a pH of 7 to about 11.

The process of any of the preceding paragraphs, wherein treating with a base is at pH of about 10 to about 11.

The process of any of the preceding paragraphs, wherein the base is added so as to maintain the pH of between about 10 to about 11.

The process of any of the preceding paragraphs, wherein the quenching acid is a combination of formic acid and sulfuric acid.

The process of any of the preceding paragraphs, wherein the stabilized polyamidoamine-epihalohydrin resin composition has less than about 500 ppm of 1,3-dihalopropanol and 3-halopropanediol.

The process of any of the preceding paragraphs, wherein the epihalohydrin is epichlorohydrin, and the 1,3-dihydroxypropanol and 3-halopropanediol are 1,3-dicloropropanol and 3-chloropropanol, respectively.

The process of any of the preceding paragraphs, wherein the stabilized polyamidoamine-epihalohydrin resin composition has improved storage stability.

The process of any of the preceding paragraphs, wherein the process further comprises adding a stabilizing agent to the stabilized polyamidoamine-epihalohydrin resin composition.

The process of any of the preceding paragraphs, wherein the stabilizing agent is a low molecular weight, water soluble organic compound; a water soluble inorganic complexing metal salt, or a combination thereof.

A process for producing a stabilized polyamidoamine-epihalohydrin aqueous resin composition, consisting essentially of
treating a polyamidoamine-epihalohydrin resin mixture containing halogenated epichlorohydrin byproducts with an inorganic base and diethanolamine to obtain a base/diethanolamine-treated resin mixture; and
adding a quenching acid to the base/diethanolamine reaction mixture to obtain a product polyamidoamine-epihalohydrin resin composition having less than about 700 ppm of a combined amount of 1,3-dihydroxypropanol and 3-halopropanediol.

The process of any of the preceding paragraphs, wherein the inorganic base is sodium hydroxide.

The process of any of the preceding paragraphs, wherein the base/diethanolamine is added so as to maintain the pH of between about 10 to about 11.

The process of any of the preceding paragraphs, wherein the epihalohydrin is epichlorohydrin, and the 1,3-dihydroxypropanol and 3-halopropanediol are 1,3-dicloropropanol and 3-chloropropanol, respectively.

The invention claimed is:

1. A process for producing a polyamidoamine-epihalohydrin resin composition, comprising:
treating a polyamidoamine-epihalohydrin resin mixture containing halogenated epihalohydrin byproducts with formic acid to obtain a formic acid-treated resin mixture;
treating the formic acid-treated resin mixture with a base to obtain a formic acid-base resin mixture; and
adding a quenching acid to the formic acid-base resin mixture to obtain a polyamidoamine-epihalohydrin resin composition having less than 700 ppm of a combined amount of 1,3-dihalopropanol and 3-halopropanediol.

2. The process of claim 1, wherein the 1,3-dihalopropanol and the 3-halopropanediol are 1,3-dicloropropanol and 3-chloropropanediol, respectively.

3. The process of claim 1, wherein the polyamidoamine-epihalohydrin resin mixture has a solids content of about 10 wt % to about 50 wt %, based on the total weight of the mixture.

4. The process of claim 1, wherein the polyamidoamine-epihalohydrin resin mixture is prepared by reacting adipic acid with diethylenetriamine at a molar ratio of adipic acid to diethylenetriamine of less than 1.0:1.0.

5. The process of claim 1, further comprising treating the polyamidoamine-epihalohydrin resin mixture with a stabilizing acid prior to the treating with formic acid.

6. The process of claim 5, wherein the stabilizing acid is sulfuric acid.

7. The process of claim 1, wherein treating the polyamidoamine-epihalohydrin resin mixture comprises adding about 0.05 wt % to about 10.0 wt % of the formic acid, based on the total weight of the polyamidoamine-epihalohydrin resin mixture.

8. The process of claim 1, wherein the formic acid-treated treated resin mixture has a pH of about 2 to about 8.

9. The process of claim 1, wherein the formic acid-treated resin mixture has a solids content of about 10 wt % to about 35 wt %, based on the total weight of the formic acid-treated resin mixture.

10. The process of claim 1, wherein the base comprises diethanolamine.

11. The process of claim 1, wherein the base comprises sodium hydroxide and diethanolamine.

12. The process of claim 1, wherein the formic acid-base resin mixture has a pH of about 7 to about 11.

13. The process of claim 1, wherein the formic acid-base resin mixture has a pH of about 10 to about 11.

14. The process of claim 1, wherein the polyamidoamine-epihalohydrin resin composition has a pH of about 2 to about 4.

15. The process of claim 1, wherein the quenching acid is a combination of formic acid and sulfuric acid.

16. The process of claim 1, wherein the polyamidoamine-epihalohydrin resin composition has less than 500 ppm of the combined amount of the 1,3-dihalopropanol and the 3-halopropanediol.

17. The process of claim 16, wherein the 1,3-dihalopropanol and the 3-halopropanediol are 1,3-dicloropropanol and 3-chloropropanediol, respectively.

18. The process of claim 1, further comprising adding a stabilizing compound to the polyamidoamine-epihalohydrin resin composition in an amount of about 1% to about 15% by weight of solids of the polyamidoamine-epihalohydrin resin composition.

19. A process for producing a polyamidoamine-epihalohydrin resin composition, comprising:
treating a polyamidoamine-epihalohydrin resin mixture containing halogenated epichlorohydrin byproducts with formic acid to obtain a formic acid-treated resin mixture;
treating the formic acid-treated resin mixture with an inorganic base and diethanolamine to obtain a formic acid-base resin mixture; and
adding a quenching acid to the formic acid-base resin mixture to obtain a polyamidoamine-epihalohydrin resin composition having less than 500 ppm of a combined amount of 1,3-dihalopropanol and 3-halopropanediol.

20. The process of claim 19, the formic acid-base resin mixture has a pH of about 10 to about 11.

21. The process of claim 19, wherein the 1,3-dihalopropanol and the 3-halopropanediol are 1,3-dicloropropanol and 3-chloropropanediol, respectively.

22. The process of claim 1, wherein the quenching acid is added as a mixture comprising formic acid and sulfuric acid, and wherein the quenching acid has a molar ratio of formic acid to sulfuric acid of about 0.2:1 to about 1.5:1.

23. The process of claim 1, wherein the formic acid-treated resin mixture has a pH of about 2.5 to about 7.5, the formic acid-base resin mixture has a pH of about 7 to about 11, and the polyamidoamine-epihalohydrin resin composition has a pH of about 2 to about 4.

24. The process of claim 19, wherein the quenching acid is added as a mixture comprising formic acid and sulfuric acid, and wherein the quenching acid has a molar ratio of formic acid to sulfuric acid of about 0.2:1 to about 1.5:1.

25. The process of claim 19, wherein the formic acid-treated resin mixture has a pH of about 2.5 to about 7.5, the formic acid-base resin mixture has a pH of about 7 to about 11, and the polyamidoamine-epihalohydrin resin composition has a pH of about 2 to about 4.

* * * * *